United States Patent
Bowser et al.

(10) Patent No.: US 10,034,352 B2
(45) Date of Patent: Jul. 24, 2018

(54) SPACE SCORING FOR A LIGHTING NETWORK

(71) Applicant: Cree, Inc., Durham, NC (US)

(72) Inventors: Robert Bowser, Cary, NC (US); Matthew Deese, Raleigh, NC (US); Gary David Trott, Eatonton, GA (US); Derek Loyer, Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 15/380,491

(22) Filed: Dec. 15, 2016

(65) Prior Publication Data

US 2018/0177026 A1 Jun. 21, 2018

(51) Int. Cl.
*H05B 37/02* (2006.01)
*H05B 33/08* (2006.01)

(52) U.S. Cl.
CPC ..... *H05B 37/0227* (2013.01); *H05B 33/0827* (2013.01); *H05B 33/0854* (2013.01); *H05B 33/0872* (2013.01); *H05B 37/0218* (2013.01); *H05B 37/0272* (2013.01)

(58) Field of Classification Search
CPC ............ H05B 37/0227; H05B 37/0272; H05B 37/0254; H05B 33/0842; H05B 37/0218; H05B 33/0872; H05B 37/02; H05B 37/0245; H05B 6/682; H05B 39/02; Y02B 20/46; Y02B 20/44; Y02B 20/48; H02J 2003/003; H02J 3/14; G05B 13/028; G05B 13/029; G05B 13/0295
See application file for complete search history.

(56) References Cited

U.S. PATENT DOCUMENTS

| | | | | |
|---|---|---|---|---|
| 8,278,845 | B1 * | 10/2012 | Woytowitz | H05B 37/0263 307/1 |
| 8,755,039 | B2 * | 6/2014 | Ramer | H05B 33/0842 356/213 |
| 8,975,827 | B2 * | 3/2015 | Chobot | H05B 37/02 315/291 |
| 8,981,651 | B2 * | 3/2015 | Askin | H05B 37/0245 315/151 |
| 9,125,255 | B2 * | 9/2015 | Ramer | H05B 37/0245 |
| 9,251,472 | B1 * | 2/2016 | Linowes | G08B 19/00 |
| 9,521,724 | B1 * | 12/2016 | Berry | H05B 37/02 |
| 9,521,725 | B2 * | 12/2016 | Woytowitz | |
| 9,618,918 | B2 * | 4/2017 | O'Keeffe | G05B 15/02 |
| 9,723,673 | B2 * | 8/2017 | Carrigan | H05B 33/0842 |
| 9,723,696 | B2 * | 8/2017 | Carrigan | H05B 37/0272 |
| 9,730,298 | B2 * | 8/2017 | Vangeel | H05B 37/0245 |

(Continued)

*Primary Examiner* — Vibol Tan
(74) *Attorney, Agent, or Firm* — Withrow & Terranova, P.L.L.C.

(57) ABSTRACT

The present disclosure relates to determining one or more of a space occupancy score, space energy score, and space efficiency score for a collection of lighting endpoints in a lighting network. The space occupancy score is indicative of how effective the occupancy groups are configured for a given space or the utilization level for a space. The space energy score is indicative of how much energy the collection of lighting endpoints use or will likely use based on their configurations, actual use, or a combination thereof. The space efficiency score is indicative of the overall efficiency associated with the collection of lighting endpoints based on both occupancy and energy related metrics.

25 Claims, 11 Drawing Sheets

(56) References Cited

U.S. PATENT DOCUMENTS

| | | | | |
|---|---|---|---|---|
| 2010/0070055 A1* | 3/2010 | Kennedy | ............... | G05B 15/02 |
| | | | | 700/90 |
| 2011/0025469 A1* | 2/2011 | Erdmann | ............ | H04L 12/2809 |
| | | | | 340/10.1 |
| 2011/0057581 A1* | 3/2011 | Ashar | .................... | G01S 11/12 |
| | | | | 315/312 |
| 2015/0008831 A1* | 1/2015 | Carrigan | ............ | H05B 33/0842 |
| | | | | 315/153 |
| 2015/0048758 A1* | 2/2015 | Carrigan | ............ | H05B 33/0842 |
| | | | | 315/294 |
| 2015/0102747 A1* | 4/2015 | Wang | ........................ | H02J 3/14 |
| | | | | 315/294 |
| 2015/0195883 A1* | 7/2015 | Harris | ............... | H05B 33/0845 |
| | | | | 315/155 |

* cited by examiner

SPACE SCORING FOR A LIGHTING NETWORK

FIELD OF THE DISCLOSURE

The present disclosure relates to scoring occupancy, energy, or efficiency metrics for a collection of lighting endpoints associated with a space.

BACKGROUND

There is significant regulatory and environmental motivation to improve the efficiency associated with residential, industrial, and commercial buildings. As a result, these buildings incorporate many energy efficient components, such as enhanced insulation, thermally efficient windows and doors, high efficiency heating ventilation and air conditioning (HVAC) systems, solar panels, and high-efficiency lighting systems, such as the LED-based lighting systems provided by Cree, Inc., 4600 Silicon Drive, Durham, N.C. 27703. In many instances, the lighting systems are highly intelligent and highly configurable, wherein if they are configured properly and customized to the particular environment, the efficiency of these lighting systems is extremely high. However, the lighting systems are generally commissioned with a basic or generic configuration, without being tailored to the environment.

In many instances, the owners or users of the building have little way of knowing whether or not their lighting system is actually operating efficiently or could be further optimized. Even if there is an indication that the efficiency of the lighting system could be improved, figuring out how to optimize the lighting system often boils down to a guessing game with the only feedback being a power bill, which is an aggregate of energy cost associated with the lighting system, HVAC system, computer systems, and any other power requirements of the buildings.

Accordingly, there is a need for technology that collects efficiency related information from a collection of lighting endpoints and presents the information in a manner that is readily understandable and effective to drive actions.

SUMMARY

The present disclosure relates to determining one or more of a space occupancy score, space energy score, and space efficiency score for one or more occupancy groups in a lighting network. The space occupancy score is indicative of how effective the occupancy groups are configured for a given space and may be used to indicate utilization of a space. For example, the space occupancy score may be based on a ratio of the number of lighting fixtures experiencing self-occupancy to the total number of lighting fixtures in the occupancy group, the number of lighting fixtures in the occupancy group, or a combination thereof. The space energy score is indicative of how much energy occupancy groups or other collection of lighting endpoints use or will likely use based on their configurations, actual use, or a combination thereof. For example, the space energy score may be based on one or more of: task tuning levels, occupancy auto-off levels, occupancy auto-on levels, daylight harvesting, and dimming levels for the lighting fixtures and the occupancy group. The space efficiency score is indicative of the overall efficiency associated with the occupancy groups based on both occupancy and energy related metrics. For example, the space efficiency score may be based on both the space occupancy score and the space efficiency score for a given occupancy group or set of occupancy groups.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
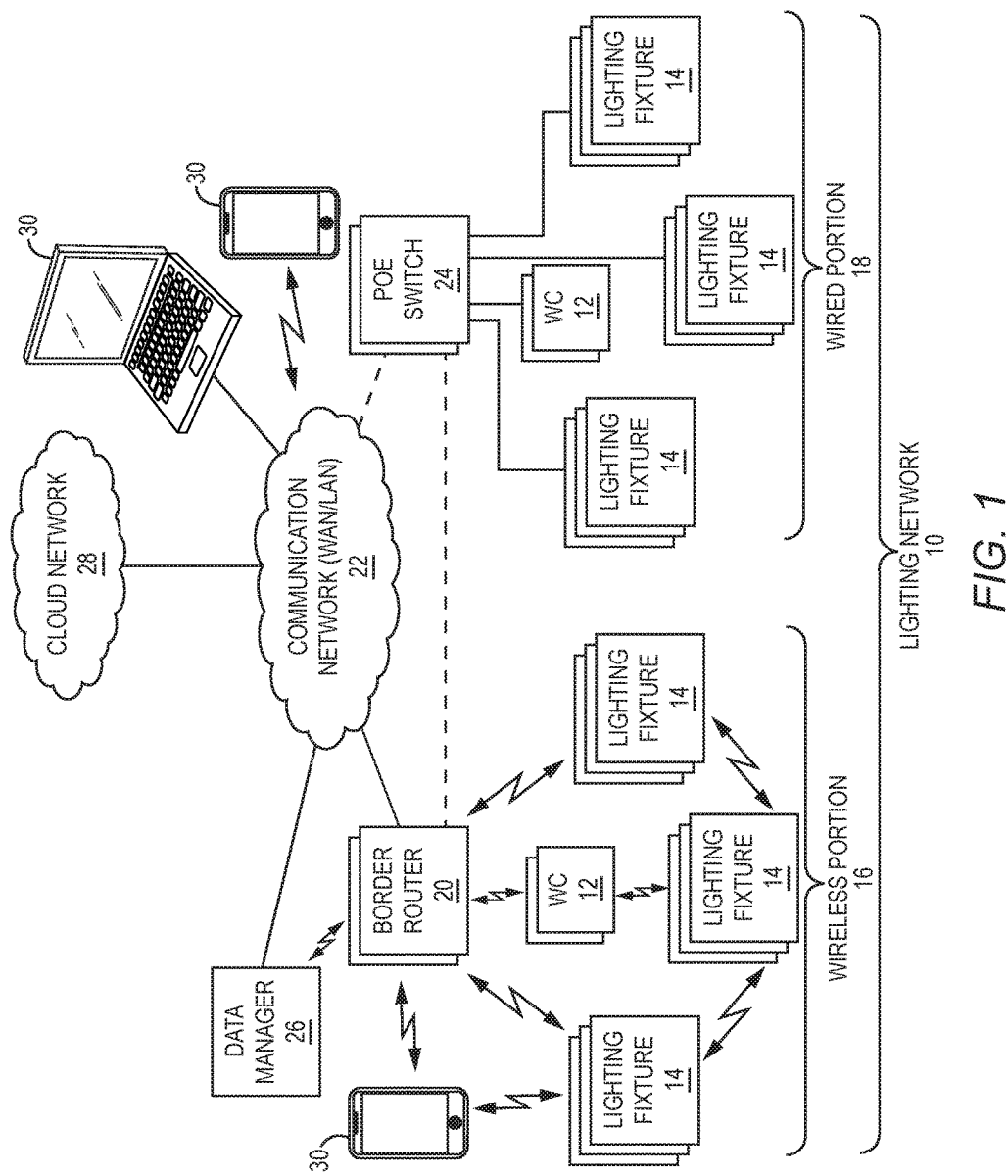
FIG. 1 illustrates a lighting network according to one embodiment of the disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

The present disclosure relates to determining one or more of a space occupancy score, space energy score, and space efficiency score for one or more occupancy groups in a lighting network. The space occupancy score is indicative of how effective the occupancy groups are configured for a given space. For example, the space occupancy score may be based on a ratio of the number of lighting fixtures experiencing self-occupancy to the total number of lighting fixtures in the occupancy group, the number of lighting fixtures in the occupancy group, or a combination thereof. The space energy score is indicative of how much energy the occupancy groups use or will likely use based on their configurations, actual use, or a combination thereof. For example, the space energy score may be based on one or more of: task tuning levels, occupancy-auto off levels, daylight harvesting, and dimming levels for the lighting fixtures and the occupancy group. The space efficiency score is indicative of the overall efficiency associated with the occupancy groups based on both occupancy and energy related metrics. For example, the space efficiency score may be based on both the space occupancy score and the space efficiency score for a given occupancy group or set of occupancy groups.

Notably, space occupancy, energy, and efficiency groups may be determined for virtually any group of lighting fixtures, wall controllers, or the like, which is referred to as a collection of endpoints, wherein the scores are not linked to an occupancy group. These groups may be based on type of fixture, location, space type, space function, and the like. The concepts described below may be used for each of these types of groups. For example, scores may be determined for entire area, floor, building, group of buildings in the same or different locations, and the like.

These concepts and terms will be described in detail below. Prior to doing so, an overview of an exemplary lighting network is described to provide context for the concepts described herein.

With reference to FIG. 1, the lighting network 10 is illustrated according to one embodiment. The lighting network 10 includes a number of wall controllers (WC) 12 and lighting fixtures 14, which are divided into a wireless portion 16 and a wired portion 18. Those wall controllers 12 and lighting fixtures 14 that reside in the wireless portion 16 may wirelessly communicate with each other and either directly or indirectly with a border router 20, or like device, that facilitates an interface with communication network 22. The communication network 22 may represent one or more local area networks (LAN), a wide area networks (WAN), or any combination thereof. In one embodiment, the wall controller 12, lighting fixtures 14, and border router 20 in the wireless portion 16 may form a mesh network or other wireless network that supports either distributed or centralized communication and control for a variety of lighting applications.

For the wired portion 18, the wall controllers 12 and the lighting fixtures 14 are coupled to at least one power over Ethernet (PoE) switch 24, which is coupled to the communication network 22 directly through the border router 20, or via a gateway or like device that facilitates an interface with the communication network 22. If the wall controllers 12 and the lighting fixtures 14 are configured as PoE devices, the PoE switch 24 can supply power to these devices as well as facilitate communications with and between these devices over Ethernet cabling.

As described further below, a data manager 26 may reside directly on the lighting network 10, on the communication network 22, or somewhere in a cloud network 28. The data manager 26 will collect information from the various devices in the lighting network 10, process the information, and provide the information presentation to a user via various user devices 30. The user devices 30 may range from mobile terminals, smart phones, notebook computers, desktop computers, dedicated commissioning tools, and the like. Further, the data manager 26 may be a single computing device, such as a server, or group of computing devices working in concert. The data manager 26 may collect the information from the devices in the lighting network 10 directly, via the border router 20, via the communication network 22, and the like. The data manager 26 may also be configured to provide data, control, and configuration information to the various devices of the lighting network 10. For further information on intelligent lighting networks, please see U.S. patent application Ser. No. 14/588,762, filed Jan. 2, 2015; U.S. patent application Ser. No. 15/192,479, filed Jun. 24, 2016; and U.S. patent application Ser. No. 15/192,035, filed Jun. 24, 2016, which are incorporated herein by reference in their entireties.

Figure 2:
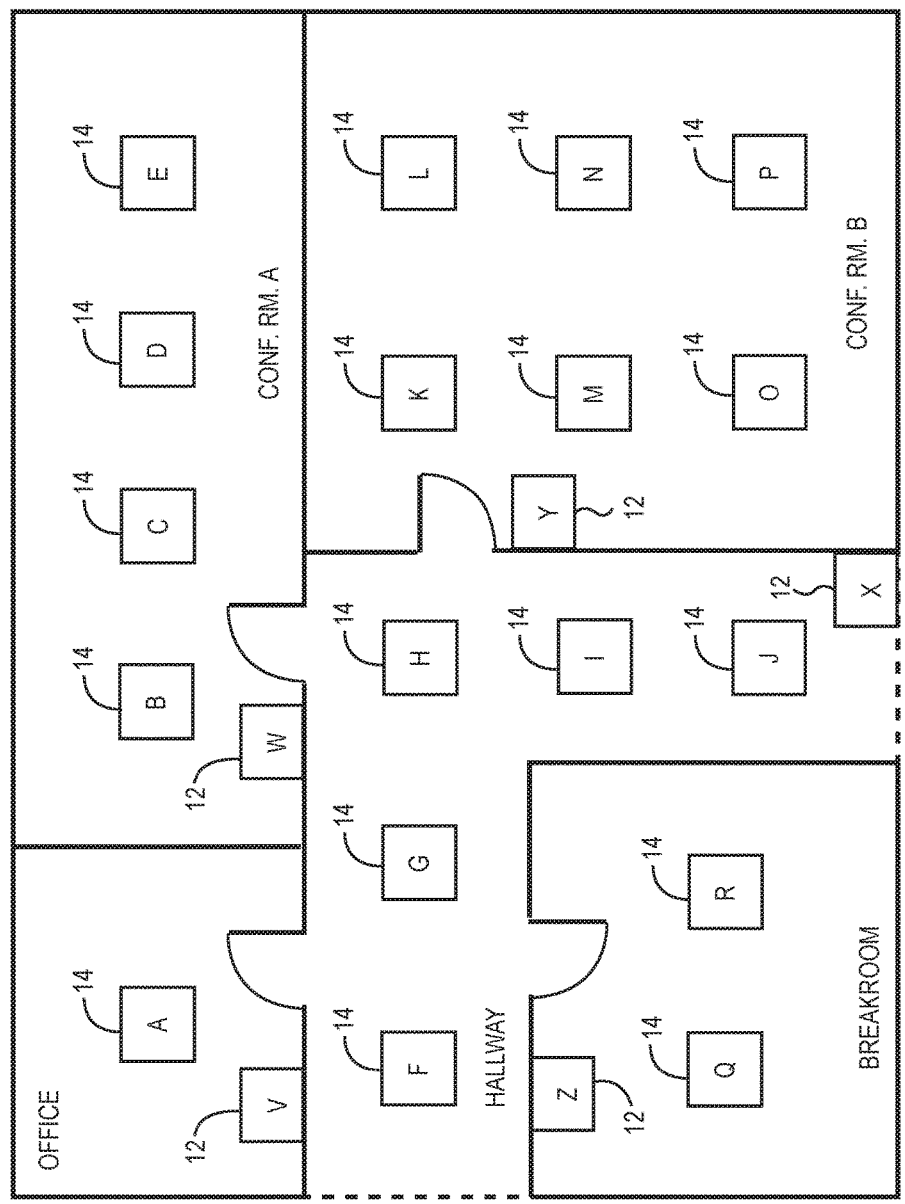
FIG. 2 illustrates an exemplary space in which the lighting network is divided into multiple occupancy groups according to one embodiment of the disclosure.

The lighting fixtures 14 and wall controllers 12 are generally distributed throughout a building. FIG. 2 provides a simplified floor diagram of building that includes an office, a break room, a hallway, and two conference rooms, which are referred to as conference room A and conference room B. For this example, assume that the illustrated space represents the third floor of Building 2. The office includes lighting fixture 14-A, which may be controlled by wall controller 12-V; conference room A includes lighting fixtures 14-B through 14-E, which may be controlled by wall controller 12-W; the hallway includes lighting fixtures 14-F through 14-J, which may be controlled by wall controller 12-X; conference room B includes lighting fixtures 14-K through 14-P, which may be controlled by wall controller 12-Y; and the breakroom includes lighting fixtures 14-Q and 14-R, which may be controlled by wall controller 12-Z.

For the following discussion, an endpoint is a single node in the lighting network 10 and typically corresponds to a wall controller 12 or a lighting fixture 14. Each endpoint may have one or more sensors or functions that are capable of monitoring power or energy usage, activity for occupancy determinations, ambient light levels, sound, vibrations, temperature, humidity, and the like. The collection, analysis, and processing of various sensor data from the sensors of the endpoints allows applications to provide meaningful information to building owners and tenants. In the illustrated embodiments, the data manager 26 provides the collection, analysis, and processing of the various data; however, these functions may also be provided in a centralized or distributed fashion with virtually any available device or group of devices, including lighting fixtures 14, the user devices 30, the border router 20, and the like.

The data manager 26 may include or support various functions and applications as well as include a database in which a variety of information may be stored. For example, the data manager 26 may include a data collector function and an application program interface (API), which is tasked with gathering information from the various endpoints in response to requests from the data collector function. Information from the endpoints may be requested by the API or may be pushed to the API by the endpoints, depending on the type of information, the endpoint providing information, and configuration of the lighting network 10.

As described in further detail below, the space occupancy, energy, and efficiency scores may be calculated from information gathered from the endpoints as well as information about the endpoints. In the illustrated embodiments, the space occupancy, energy, and efficiency scores are created for individual occupancy groups or spaces, which are formed from one or more occupancy groups. An occupancy group is a logical grouping of endpoints that should respond "together" to an occupancy event being detected by any one of more of the endpoints in that particular occupancy group. Notably, an occupancy group may include only one lighting fixture 14. An occupancy event is defined as detecting activity, the lack of activity, or the lack of activity for a certain period of time in an area in which one or more endpoints reside. Each occupancy group may be divided into multiple switch groups, wherein each switch group is associated with and may be independently controlled by one or more wall controllers 12. The scores provided herein may be determined for each switch group.

For example, lighting fixtures 14 and associated wall controllers 12 for the five different areas depicted in FIG. 2 may grouped into five unique occupancy groups. For conference room A, lighting fixtures 14-B through 14-E and wall controller 12-W may form one occupancy group, which is referred to as:

"conference room A occupancy group." If any one lighting fixture 14-B through 14-E detects an occupancy event indicative of activity, every lighting fixture 14-B through 14-E in conference room A will turn on to a desired light output level; however, the lighting fixtures 14 in the other areas should not turn on due to the activity detected in conference room A, because they are in different occupancy groups. As long as one or more of the lighting fixtures 14-B through 14-E in conference room A detects activity, the lighting fixtures 14-B through 14-E will stay on. After all of the lighting fixtures 14-B through 14-E in the conference room A fail to detect activity for a certain period of time, the lighting fixtures 14-B through 14-E will turn off, or dim to a lower (non-occupied) output level.

A space is defined herein as an abstract logical grouping of one or more related occupancy groups. For example, assume that the following occupancy groups are defined:
 Conference Room A Occupancy Group;
 Conference Room B Occupancy Group;
 Office occupancy group;
 Hallway Occupancy Group; and
 Breakroom Occupancy Group.

Each occupancy group may correspond to a space, or two or more of the occupancy groups may be combined or grouped together for a defined space. In the latter instance, a conference room space could include the conference room A and conference room B occupancy groups. The following discussion identifies numerous individual metrics, which are referred to as scores, that may be used to calculate the space occupancy, energy, and efficiency scores.

Self-Occupancy Score

For occupancy detection, each lighting fixture 14 has a Passive Infra-Red (PIR) sensor, an image sensor, or the like that is configured as an occupancy sensor. Each lighting fixture 14 will monitor the output of the occupancy sensor to detect an activity within the sensor's zone of detection. When the lighting fixture 14 detects activity via its own occupancy sensor, which is referred to as self-occupancy, the lighting fixture 14 may set a self-occupancy flag to be True as well as set a self-occupancy timer. Before the self-occupancy timer expires, the self-occupancy timer is reset whenever activity is detected and the self-occupancy flag remains set to True. If the self-occupancy timer expires because no activity is detected, the self-occupancy flag is cleared, wherein the process will repeat once activity is detected.

If any lighting fixture 14 in an occupancy group detects self-occupancy, each of the lighting fixtures 14 in the group should turn on to the desired output level. If the lighting fixture 14 is off when self-occupancy is detected, the lighting fixture 14 may also set a group occupancy flag to True, set a group-occupancy timer, turn on to the desired output level, and send a message to the other lighting fixtures 14 in its occupancy group that self-occupancy was detected. In response to receiving this message, the other lighting fixtures 14 in the occupancy group will set their group-occupancy flag to True, set a group-occupancy timer, and turn on at the desired output level. Any time activity is detected by a lighting fixture 14 in the group before the group-occupancy timer expires, the lighting fixture 14 will notify the other lighting fixtures 14 in the occupancy group, which will respond by resetting their group-occupancy timer. When the group-occupancy timers expire due to no activity being detected, the lighting fixtures 14 in the group will either turn off or dim to a desired unoccupied state, wherein the group-occupancy and self-occupancy flags are False. The process will repeat once any one of the lighting fixtures 14 in the occupancy group detects activity.

While the above example is one where each of the lighting fixtures 14 work in concert under distributed control, other examples may use a central authority, such as the data manager 26, to collect occupancy states and provide instructions to the lighting fixtures 14 to turn on and off due to activity being detected by any one or more of the lighting fixtures 14 in the occupancy group, as those skilled in the art will appreciate. As such, group-occupancy indicates whether or not a particular space associated with an occupancy group is considered occupied. If any lighting fixture 14 within an occupancy group detects self-occupancy, group occupancy for the associated space is set to 'true.' It is possible for every lighting fixture 14 in an occupancy group to detect self-occupancy. It is also possible for only one lighting fixture 14 within an occupancy group to detect self-occupancy. In any case, whenever at least one lighting fixture 14 detects self-occupancy, group occupancy is set to true.

For certain embodiments of the present disclosure, keeping track of the self-occupancy state for each lighting fixture 14 in an occupancy group as well as the group-occupancy for the occupancy group plays a vital role in monitoring how a space is being used and how efficient the space is being illuminated. For example, assume an occupancy group has 50 lighting fixtures. If a vast majority of the lighting fixtures 14 usually detects activity (i.e. self-occupancy is True) whenever the occupancy group is active, one can assume that little energy is wasted lighting areas that are not actually occupied. However, if only one or relatively few of the lighting fixtures 14 in the occupancy group actually detect activity (i.e. self-occupancy is True), one can assume that significant energy is wasted lighting areas that are not actually occupied. A real-life example would be a large open space filled with cubicles, wherein all of the lighting fixtures 14 for the space are associated with one occupancy group. If only the cubicles in one corner of the space were actually used, detecting activity in this one corner results in the lights in the entire space to turn on, even though a vast majority of the space is actually unoccupied and does not require illumination. In this instance, overall efficiency would likely be increased if the larger occupancy group were broken into smaller occupancy groups, wherein the self-occupancy rate within a particular occupancy group is relatively high.

The following discussion relates to generating a self-occupancy score, which provides an efficient metric for determining how efficient the space is illuminated based on actual occupancy throughout the space. For a defined space, the self-occupancy score may be a linear or nonlinear function of the number of lighting fixtures 14 with self-occupancy being true in the defined space and the total number of lighting fixtures 14 in the defined space. An exemplary nonlinear function is illustrated FIG. 3, wherein the vertical axis represents the self-occupancy score and the horizontal axis represents an occupancy ratio. The occupancy ratio corresponds to the number of lighting fixtures 14 with self-occupancy being true (Self-Occupied Fixtures) in the defined space divided by the total number of lighting fixtures 14 (Total Fixtures) in the defined space and may be represented by the following equation:

Occupancy Ratio=Self-Occupied Fixtures/Total Fixtures*100

Figure 3:
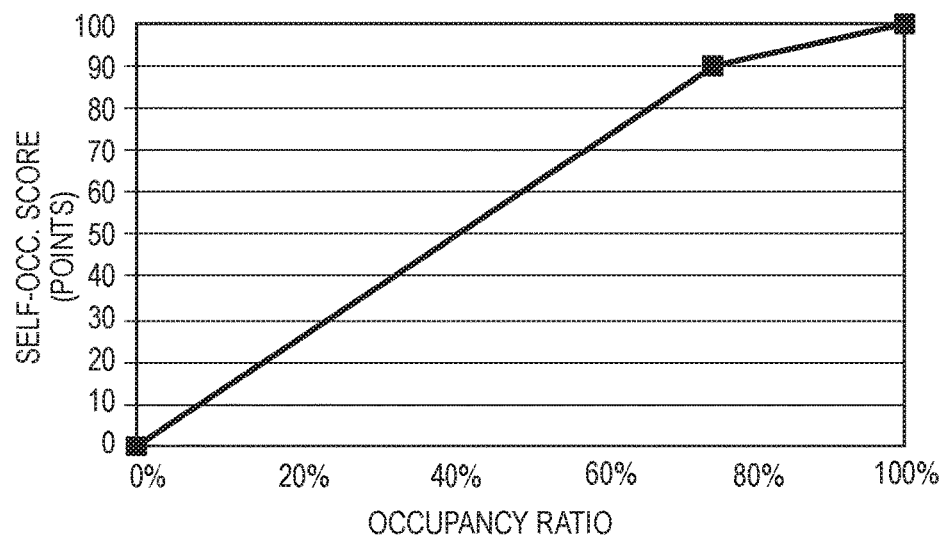
FIG. 3 is a graph that illustrates a function for converting an occupancy ratio into a self-occupancy score according to one embodiment of the disclosure.

The defined space corresponds to one or more occupancy groups. As illustrated in the example of FIG. 3, the function for the self-occupancy score allocates points more rapidly for increasing the occupancy ratio in the range of 0 to 75% and less rapidly for increasing the occupancy ratio in the range of 75% to 100%. For occupancy ratios of 15%, 50%, 75%, 90%, and 100%, the corresponding self-occupancy scores would be approximately 20, 60, 90, 95, and 100. Notice that increasing the occupancy ratio from 50% to 75% results in a 30 point increase in the self-occupancy score, whereas increasing the occupancy ratio from 75% to 100% results in a 10 point increase in the self-occupancy score. While the function for the self-occupancy score is shown as having two linear segments, the function may take virtually any form based on the desired incentives. In this instance, there is a desire to encourage occupancy groups to be configured such that the associated occupancy ratios are at least 75% when these occupancy groups are active, and thus providing illumination.

For the self-occupancy score, the data manager 26 may directly or indirectly obtain self-occupancy information and group occupancy from the various lighting fixtures 14 or other devices associated with the lighting network 10. The manner and format in which this information is provided to the data manager 26 may vary from application to application. Since self-occupancy and group occupancy are dynamic variables, the lighting fixtures 14 may continuously or periodically report state changes for self-occupancy and group occupancy to the data manager as they occur, collect time-stamped state changes over a period of time in a report and send the report to the data manager 26, and the like. Further, the self-occupancy and group occupancy information provided to the data manager 26 may range from raw state, which must be parsed and processed by the data manager 26, to processed data that is arranged in a format that requires less processing by the data manager 26. For example, the lighting fixtures 14 in each group could determine the self-occupancy score and report the score to the data manager 26. The nature, format, and timing of the reporting may vary from application to application. What is important is that the data manager 26 receives sufficient information from the lighting fixtures 14 or other devices to determine a self-occupancy score for each occupancy group. The data manager 26 may query the lighting network 10 or be provided with sufficient information from a user to identify the various occupancy groups and the makeup thereof.

Occupancy Auto-Off Score

As indicated above, after none of the lighting fixtures 14 in an occupancy group have detected activity in the associated space for a set amount of time, all of the lighting fixtures 14 in the occupancy group will automatically transition from a higher occupied light output level to either a zero light output or a reduced light output level. The occupancy auto-off score is based on the reduced light output level. In one embodiment, an occupancy auto-off level is the percentage reduction from the maximum allowable light output level that corresponds to the reduced light output level. For example, if the reduced light output level is zero, wherein no light is provided by the lighting fixture 14, the occupancy auto-off level is 100%. If the reduced light output level is 20% of the maximum allowable light output level, the occupancy auto-off level is 80%.

Figure 4:
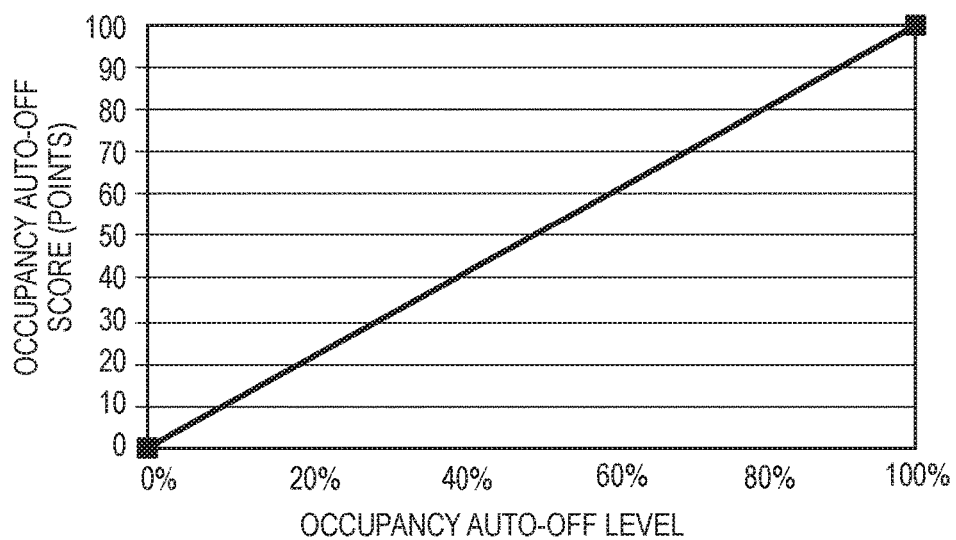
FIG. 4 is a graph that illustrates a function for converting an occupancy auto-off level into an occupancy auto-off score according to one embodiment of the disclosure.

FIG. 4 illustrates a linear function that provides an occupancy auto-off score based on the occupancy auto-off level for the lighting fixture 14. As such, an occupancy auto-off level of 100%, which corresponds to the lighting fixture 14 being turned completely off when the space is not occupied, results in the maximum occupancy auto-off score of 100. An occupancy auto-off level of 90%, results in an occupancy auto-off score of 90. While a linear function is illustrated, the function associated with the occupancy auto-off score may be nonlinear, as illustrated for various ones of the above-described scores.

For the occupancy auto-off score, the data manager 26 must have access to the occupancy auto-off level for the associated occupancy group or the lighting fixtures 14 in that group. The occupancy auto-off level is a relatively static setting, which will not change dynamically based on occupancy or environmental conditions. As such, the occupancy auto-off level for the associated occupancy group or the lighting fixtures 14 in that group may be provided to the data manager 26 by the lighting fixtures 14, a user, or other device once and may be updated only if changed from time to time. In other words, there is typically no need to continuously or periodically update information bearing on the occupancy auto-off level.

Task Tuning Score

Each lighting fixture 14 may be configured to artificially limit its maximum light output level. Where a lighting fixture 14 is generally capable of operating in a range between zero (0%) and a maximum potential light output level (100%), task tuning artificially sets a maximum allowable light output level to be less than the maximum potential light output level. The reduction from the maximum potential light output level is referred to as a task tuning level, and in this example, the task tuning level corresponds to the percentage by which the maximum potential light output level is reduced to achieve the maximum allowable light output level. For example, a building manager may decide to save energy by setting the task tuning level such that the lighting fixture 14 will not exceed a maximum potential light output level that corresponds to 90% of the maximum potential output light level. In this example, the task tuning level corresponds to 10% (100%-90%). If the maximum allowable output light level is 75% of the maximum potential output light level, the corresponding task tuning level would be 25%. The task tuning level can be set to any level below the maximum potential output light level and will function to ensure that the lighting fixture 14 is never driven such that its light output level exceeds the maximum allowable output light level.

Figure 5:
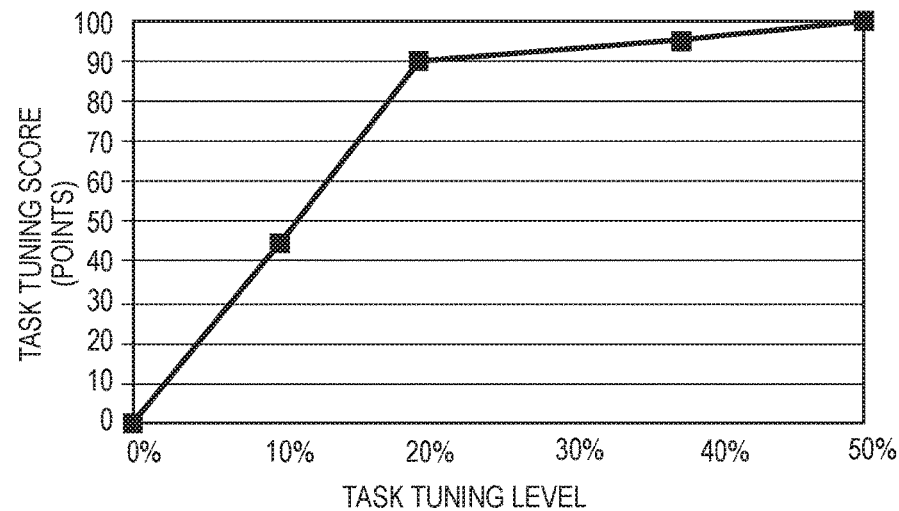
FIG. 5 is a graph that illustrates a function for converting a task tuning level into a task tuning score according to one embodiment of the disclosure.

A task tuning score may be calculated based on the task tuning level. For a defined space, the task tuning score may be a linear or nonlinear function of the task tuning level for the lighting fixtures 14 in the space. An exemplary nonlinear function is illustrated in FIG. 5, wherein the vertical axis represents the task tuning score and the horizontal axis represents a task tuning level, which as noted above, is represented as a percentage reduction from the maximum potential light output level of the lighting fixtures 14. The defined space corresponds to one or more occupancy groups. As illustrated in the example of FIG. 5, the function increases the task tuning score as the task tuning level increases; however, the illustrated function is not linear. In this example, the function for task tuning score allocates points more rapidly for increasing the task tuning level in the range of 0 to 20% and less rapidly for increasing the task tuning level in the range of 20% to 50%. In other words, once the task tuning level exceeds 20%, the rate at which points are awarded slows down.

Configuring the task tuning level function in this manner encourages setting a task tuning level, but does not incentivize setting the task tuning level to an unreasonably high level, which could result in insufficient illumination of the space. For task tuning levels of 10%, 20%, and 50%, the corresponding task tuning level scores would be approximately 45, 90, and 100. Notice that increasing the task tuning level from 0% to 20% results in a 90 point task tuning score, whereas increasing the occupancy ratio from 20% to 50% or more results in only 10 point increase in the task tuning score. While the function for the task tuning score is shown having four linear segments, the function may take virtually any form based on the desired incentives.

For the task tuning score, the data manager 26 must have access to the task tuning level for the associated occupancy group or the lighting fixtures 14 in that group. Like the occupancy auto-off level, the task tuning level is a relatively static setting, which will not change dynamically based on occupancy or environmental conditions. As such, the task tuning level for the associated occupancy group or the lighting fixtures 14 in that group may be provided to the data manager 26 by the lighting fixtures 14, a user, or other device once and updated only if changed from time to time. There is typically no need to continuously or periodically update information bearing on the task tuning level.

Daylight Harvesting Score

Daylight harvesting is the process of adjusting the light output of lighting fixtures 14 based on an amount of external ambient light that is available in the space. At higher ambient light levels, the lighting fixtures 14 may reduce their light output in an effort to maintain overall light levels, which include light from the lighting fixtures 14 and the ambient light from external sources, at a desired level. At lower ambient light levels, the lighting fixtures 14 may increase their light output in an effort to maintain the overall illumination at the desired level. The lighting fixtures 14 may use their associated ambient light sensors to monitor the overall illumination and adjust their light output such that the overall illumination in the space corresponds to the desired level. Daylight harvesting may be implemented on a fixture-by-fixture basis or as a group in a coordinated fashion. Regardless of the manner in which daylight harvesting is implemented, energy is saved whenever the lighting fixtures 14 can reduce their light output levels in the presence of ambient light. The greater the reduction in light output levels, the greater the amount of energy saved, and vice versa.

To calculate a daylight harvesting score, the extent of the daylight harvesting is tracked. Like the task tuning level, a daylight harvesting level is determined and used to calculate a daylight harvesting score. The reduction from the maximum allowable light output level corresponds to a daylight harvesting level, and in this example, the daylight harvesting level corresponds to the percentage by which the maximum allowable light output level is reduced in response to the presence of ambient light.

A daylight harvesting score may be calculated based on the daylight harvesting level. For a defined space, the daylight harvesting score may be a linear or nonlinear function of the daylight harvesting level for the lighting fixtures 14 in the space. An exemplary nonlinear function is illustrated FIG. 6, wherein the vertical axis represents the daylight harvesting score and the horizontal axis represents a daylight harvesting level, which as noted above, is represented as a percentage reduction from the maximum allowable light output level of the lighting fixtures 14 in response to the presence of ambient light. The defined space corresponds to one or more occupancy groups.

Figure 6:
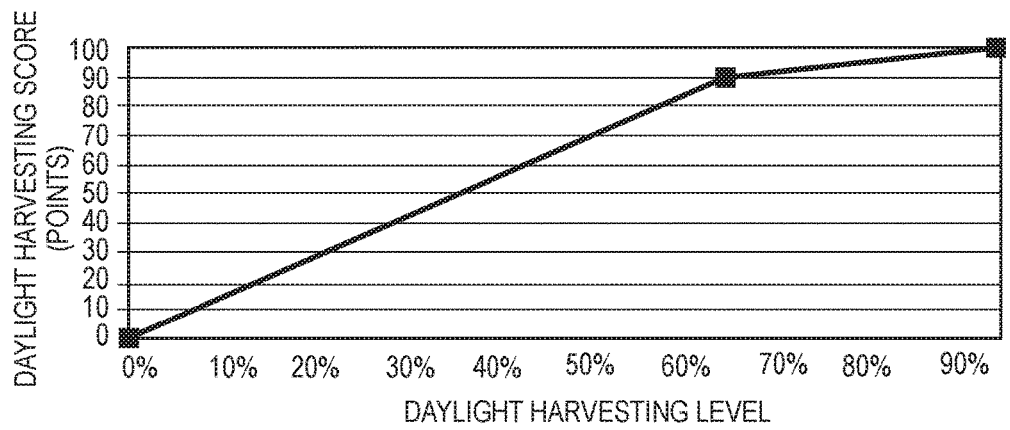
FIG. 6 is a graph that illustrates a function for converting a daylight harvesting level into a daylight harvesting score according to one embodiment of the disclosure.

As illustrated in the example of FIG. 6, the function for the daylight harvesting score increases the daylight harvesting score as the daylight harvesting level increases; however, the illustrated function is not linear. In this example, the function for the daylight harvesting score allocates points more rapidly for increasing the daylight harvesting level in the range of 0 to 65% and less rapidly for increasing the daylight harvesting level in the range of 65% to 95%. In other words, once the daylight harvesting level exceeds 65%, the rate at which points are awarded slows down. For daylight harvesting levels of 20%, 65%, and 95%, the corresponding daylight harvesting scores would be approximately 30, 90, and 100. While the function for the daylight harvesting score is shown as having two linear segments, the function may take virtually any form based on the desired incentives. If a lighting fixture 14 or group thereof is incapable of daylight harvesting, its daylight harvesting score may be set to the maximum value in an effort not to penalize lighting fixtures 14 that cannot daylight harvest or are not in a location that will receive ambient light from external sources. Alternatively, a reduced default daylight harvesting score may be assigned to those lighting fixtures that cannot daylight harvest or are not in a location that will receive ambient light from external sources.

For the daylight harvesting score, the data manager 26 may directly or indirectly gather daylight harvesting information from the various lighting fixtures 14 or other device associated with the lighting network 10. The manner and format in which this information is provided to the data manager 26 may vary from application to application. Since daylight harvesting is a dynamic variable and will vary from fixture to fixture, the lighting fixtures 14 may continuously or periodically report daylight harvesting levels to the data manager 26, aggregate daylight harvesting data over a period of time in a report and send the report to the data manager 26, and the like. Further, the daylight harvesting data provided to the data manager 26 may range from raw data, which must be parsed and processed by the data manager 26, to processed data that is arranged in a format that requires less processing by the data manager 26. The nature, format, and timing of the reporting may vary from application to application. What is important is that the data manager 26 receives sufficient information from the lighting fixtures 14 or other device to characterize the daylight harvesting for each lighting fixture or for the group as a whole and generate a daylight harvesting score for each occupancy group (and lighting fixture 14, if so desired).

Group Size Score

Figure 7:
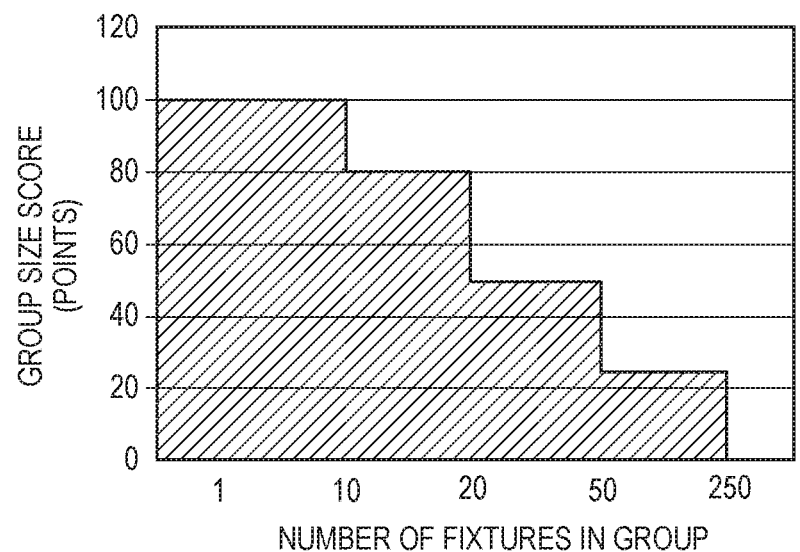
FIG. 7 is a graph that illustrates a function for converting the number of lighting fixtures in a group into a group size score according to one embodiment of the disclosure.

Keeping lighting fixtures 14 in smaller occupancy groups generally results in greater occupancy related energy savings, because there are fewer lighting fixtures 14 turned on during any occupancy event. The group size score is configured such that higher scores are provided to smaller groups, and vice versa. FIG. 7 provides an illustrative example. For groups between 1 and 10 lighting fixtures 14, each lighting fixture 14 is assigned a value of 100 points; for groups between 11 and 20 lighting fixtures 14, each lighting fixture 14 is assigned a value of 80 points; for groups between 21 and 50 lighting fixtures 14, each lighting fixture 14 is assigned a value of 50 points; for groups between 51 and 250 lighting fixtures 14, each lighting fixture 14 is assigned a value of 25 points; and for groups with more than 250 lighting fixtures 14, each lighting fixture 14 is assigned zero points. A similar scoring system may be provided for switch groups, wherein a switch group size score will correspond to the number of lighting fixtures 14 that are grouped together and controlled collectively by one or more wall controllers 12.

For the group size score, the data manager 26 must have access to the lighting fixtures 14, and perhaps the wall controllers 12, that are in the occupancy group to determine the number of endpoints in the occupancy group. Otherwise, the data manager 26 must be provided with information that identifies the number of endpoints in the occupancy group. Like the occupancy auto-off level, the group size is a relatively static setting, which will not change dynamically based on occupancy or environmental conditions. As such, the number and/or type of endpoints in the occupancy group may be provided to the data manager 26 by the lighting fixtures 14, a user, or other device once and updated only if the makeup of the group changes from time to time. There is typically no need to continuously or periodically update information bearing on the group size.

Dimming Score

The lighting fixtures 14 may be dimmed through an associated wall controller 12 or remote control entity. A dimming score may be provided based on the extent of the dimming. Dimming may be the result of manually dimming or through automatic application of a dim level by using the occupied auto-on level.

The greater the dimming level, the lower the energy consumption by the lighting fixtures 14. Notably, 0% dimming corresponds to the maximum allowable light output level for a given lighting fixture 14, and 100% dimming corresponds to the lighting fixture 14 not outputting any light. Notably, the maximum allowable light output level may be set to the maximum potential light output level for any of the above scores.

Figure 8:
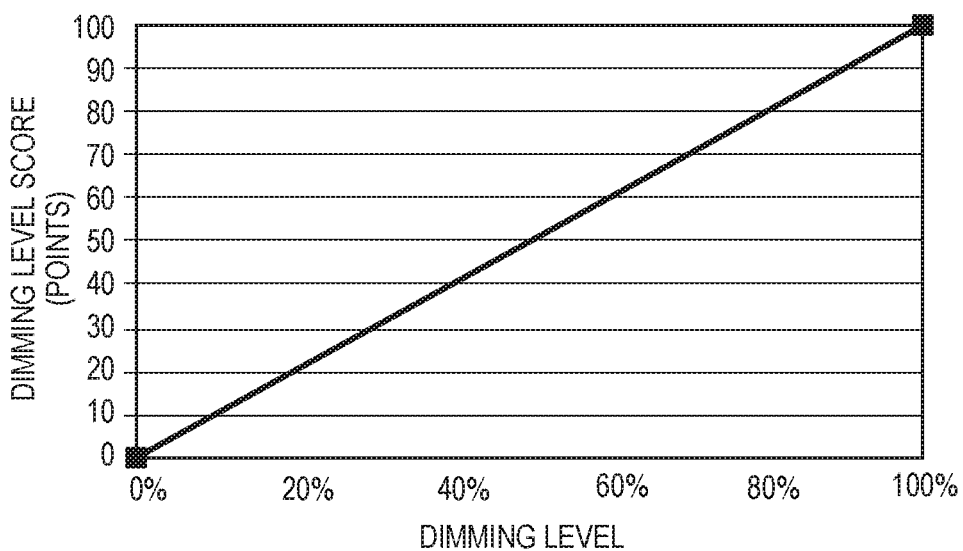
FIG. 8 is a graph that illustrates a function for converting a dimming level into a dimming level score according to one embodiment of the disclosure.

FIG. 8 illustrates a linear function that provides a dimming score based on the dimming level for the lighting fixture 14. As such, a dimming level of 100%, which corresponds to the lighting fixture 14 being turned completely off, results in the maximum dimming score of 100. A dimming level of 50%, results in a dimming score of 50. While a linear function as illustrated, the function associated with the dimming score may be nonlinear, as illustrated for various ones of the above-described scores.

For the dimming score, the data manager 26 may directly or indirectly gather dimming information from the various lighting fixtures 14 or other device associated with the lighting network 10. The manner and format in which this information is provided to the data manager 26 may vary from application to application. Since dimming level is a dynamic variable and will vary from fixture to fixture, the lighting fixtures 14 may continuously or periodically report dimming levels to the data manager 26, may aggregate dimming data over a period of time in a report and send the report to the data manager 26, and the like. Further, the dimming data provided to the data manager 26 may range from raw data, which must be parsed and processed by the data manager 26, to processed data that is arranged in a format that requires less processing by the data manager 26. The nature, format, and timing of the reporting may vary from application to application. What is important is that the data manager 26 receives sufficient information from the lighting fixtures 14 or other device to characterize the dimming activity for each lighting fixture 14 or the group as a whole and generate a dimming score for each occupancy group (and lighting fixture 14, if so desired).

Measured Energy Score

Another efficiency-related score is a measured energy score. The measured energy score corresponds to a ratio of actual power or energy consumed by the lighting fixtures 14 to the maximum possible power or energy the lighting fixtures 14 in the space could consume. The lighting fixtures 14 may be configured to monitor their power and/or energy usage. Assuming the maximum possible power or energy that the lighting fixtures 14 could consume is known, such as when they are operating at their maximum potential light output levels, a measured energy score may be calculated as follows:

> Measured Energy Score=(Current power or energy of all fixtures in the space/Maximum potential power or energy of all the fixtures in the space)*100.

The measured energy score is most effective when averaged over time or calculated based on power or energy averages over meaningful periods of time, because instantaneous measurements are unlikely to provide an accurate indication of relative energy use.

For the measured energy score, the data manager 26 may gather the actual power/energy usage information from the various lighting fixtures 14 or other device associated with the lighting network 10. The manner and format in which this information is provided to the data manager 26 may vary from application to application. Since actual power/energy usage is a dynamic variable and will vary from fixture to fixture, the lighting fixtures 14 may continuously or periodically report actual power/energy usage to the data manager 26, aggregate such data over a period of time in a report and send the report to the data manager 26, and the like. Further, the actual power/energy usage data provided to the data manager 26 may range from raw data, which must be parsed and processed by the data manager 26, to processed data that is arranged in a format that requires less processing by the data manager 26. The nature, format, and timing of the reporting may vary from application to application. What is important is that the data manager 26 receives sufficient information from the lighting fixtures 14 or other device to characterize the actual power/energy usage for each lighting fixture or the group as a whole. The maximum potential/energy ratings for the lighting fixtures 14 are relatively static and can be provided to the data manager 26 or the lighting fixtures 14 by a user or other device.

For any of the dynamically changing variables described above, sampled measurements for these variables may be averaged over time, integrated, or otherwise processed to provide more usable and reliable data for the data manager 26 to manage.

With the above individual scores, a variety of composite scores may be calculated. Three exemplary, composite scores include a space occupancy score, a space energy score, and a space efficiency score. Depending on the application, the space occupancy, energy, and efficiency scores may be based on varying combinations of the individual scores. Several non-limiting examples are provided below.

Space Occupancy Score

An exemplary space occupancy score may be computed for a space, which may include one or more occupancy groups, by summing the self-occupancy score(s) and the group size score(s) for the space, as follows:

> Space Occupancy Score=Self-Occupancy Score+Group Size Score

When the space includes multiple occupancy groups, the space occupancy score and the group size score will be the average of the corresponding scores for each of the multiple occupancy groups. The average may be weighted or unweighted, and if weighted, the weighted average may be based on the number of endpoints in each of the occupancy groups, the size of the areas associated with each of the occupancy groups, and the like.

The space occupancy score is intended to provide an efficient and effective tool to help users, landlords, tenants, and/or owners analyze how effectively the lighting fixtures 14, and perhaps the wall controllers 12, are grouped. Low scores indicate inefficient or ineffective grouping, wherein higher scores indicate more efficient and effective grouping. In general, occupancy groups with lower numbers of endpoints and in which self-occupancy rates are high are more efficient, and vice versa, and having access to appropriate space occupancy scores will encourage grouping in such a manner.

Space Energy Score

Where the space occupancy score is geared toward encouraging efficient and effective grouping of endpoints, a space energy score is geared toward understanding how much energy the various occupancy groups are relatively using and encouraging configurations that increase, if not optimize, the energy usage associated therewith.

An exemplary space energy score may be computed for a space, which may include one or more occupancy groups, by summing the task tuning score, daylight harvesting score, dimming score, and occupancy auto-off score, as follows:

> Space Energy Score=Task Tuning Score+Daylight Harvesting Score+Dimming Score+Occupancy Auto-Off Score.

As noted above, when the space includes multiple occupancy groups, the individual scores will be the average of the corresponding scores for each of the multiple occupancy groups. The average may be weighted or unweighted, and if weighted, the weighted average may be based on the number of endpoints in each of the occupancy groups, the size of the areas associated with each of the occupancy groups, and the like.

In this embodiment, the task tuning, daylight harvesting, dimming, and occupancy auto-off scores, which are summed to provide a space energy score, are derived from static and dynamic metrics that have a direct impact on the energy consumption of the lighting fixtures 14.

Space Efficiency Score

The space efficiency score is based a combination of the space occupancy score and the space energy score, or at least some or all of the individual scores that make up the space occupancy as well as the score space energy score. In one embodiment, the space energy score is simply the sum of the space occupancy score and the space energy score, wherein:

> Space Efficiency Score=Space Occupancy Score+Space Energy Score.

Again, when the space includes multiple occupancy groups, the individual scores will be the average of the corresponding scores for each of the multiple occupancy groups. The average may be weighted or unweighted, and if weighted, the weighted average may be based on the number of endpoints in each of the occupancy groups, the size of the areas associated with each of the occupancy groups, and the like.

The space efficiency score is a very effective metric for analyzing the relative efficiencies among spaces, which are formed from any number of occupancy groups. As those skilled in the art will appreciate upon reading the present disclosure, the overall efficiency of a lighting system is heavily impacted by the effectiveness of the grouping for occupancy groups, static settings that impact power consumption, and dynamic environmental and use conditions. The concepts of the present disclosure allow users to access relative scores that provide an effective overview of lighting system effectiveness and efficiency. Further, users may drill down into the data together with sufficient information to understand scores, as well as adjust system settings and configurations in an effort to improve the scores, and thus the effectiveness and efficiency of the lighting system.

Notably, the above examples for the space energy score and the space efficiency score do not include the measured energy score, but alternative embodiments may factor in the measured energy score or like measurement of consumed energy into the space energy score, the space efficiency score, or both. Alternative examples for calculating the space efficiency score are provided below.

Space Efficiency Score=Self-Occupancy Score+(Self-Occupancy Score/Measured Energy Score*100)+300−measured Energy Score+Group Size Score.   Alternative 1:

Space Efficiency Score=Self-Occupancy Score/Measured Energy Score*100+Space Occupancy Score+Task Tuning Score+Daylight Harvesting Score+Group Size Score+Occupancy Auto-Off Score+Dimming Score   Alternative 2:

Those skilled in the art will recognize various combinations, as well as additional metrics to take into consideration when arriving at the various scores.

The data necessary to determine the scores is a mix of static and dynamic data, certain of which must be collected from the lighting fixtures 14, and perhaps, the wall controllers 12. Those skilled in the art will recognize numerous ways and formats in which to collect this data. The following provides an exemplary technique for collecting the data and managing the data in an effective and efficient manner. The data that is actual sensor data or derived from the actual sensor data is referred to in general as sensor data. The data that relates to operation of a lighting fixture is referred to as operational data. The data that relates to the configuration of the lighting fixture 14, wall controller 12, and the lighting network 10 in general is referred to as configuration data. For example, the sensor data may relate to activity measurements taken via occupancy sensor for occupancy detection, and light level measurements taken by an ambient light sensor to determine ambient light levels. The operational data may relate to actual power consumption, dimming levels, and the like. The configuration data may relate to the number of lighting fixtures 14 in a particular occupancy group, occupancy auto-off levels, task tuning levels, and the like. Collectively, the sensor, operational, and configuration data is collectively referred to as lighting data. The data that changes dynamically is referred to as dynamic lighting data, and the data that tends to remain relatively static is referred to as static lighting data.

Static lighting data may be provided to the data manager 26 or collected by the data manager 26 during commissioning of the lighting network 10, during addition or removal of endpoints in the lighting network 10, and the like. The dynamic lighting data may be collected from the lighting fixtures 14, wall controllers 12, or other devices by the data manager 26 and processed on a continuous or periodic basis. An exemplary technique for dynamic lighting data collection and processing may involve collecting the dynamic lighting data every hour and calculating the space occupancy, energy, and/or efficiency scores for each occupancy group on an hourly, daily, weekly, and monthly basis. These scores may be stored in corresponding tables in the data manager 26 in a manner that allows an application to easily retrieve and display or deliver specific data as needed.

For this example, the following functions may be created and run by the data manager 26:

Hourly Score Function

An Hourly Score Function executes every hour randomly between the top of the hour (e.g. 2:00) and 10 minutes after the hour (e.g. 2:10) for each occupancy group. For a given occupancy group, the function queries and receives the various lighting data for each lighting fixture 14 in the given occupancy group and then computes the space occupancy, energy, and/or efficiency scores for the given occupancy group. Each occupancy group's occupancy, energy, and/or efficiency scores will be written in an Hour Table on an hourly basis in the data manager 26. These scores may be retained for a set period of time, such as 12 months. For the Hourly Score Function, as well as the functions described below, the space occupancy, energy, and/or efficiency scores may be calculated for spaces that include multiple occupancy groups. As such, each occupancy group within a space may have individual space occupancy, energy, and/or efficiency scores, and the space will have a unique space occupancy, energy, and/or efficiency score that is based on the scores for the occupancy groups therein.

Daily Score Function

The Daily Score Function may execute randomly once a day between certain hours, such as between 12 AM and 1 AM. On a daily basis, the function may access the last 24 hours of space occupancy, energy, and efficiency scores in the Hour Table for each occupancy group and space, as well as determine daily space occupancy, energy, and efficiency scores by averaging the last 24 hours of hourly space occupancy, energy, and efficiency scores. The daily space occupancy, energy, and efficiency scores may be stored in a Day Table and retained for a set period of time, such as 12 months.

Weekly Score Function

The Weekly Score Function may execute randomly once a week on a certain day between certain hours, such as between 12 AM and 1 AM on Sundays. On a weekly basis, the function may access the last seven days of daily space occupancy, energy, and efficiency scores in the Daily Table for each occupancy group and determine weekly space occupancy, energy, and efficiency scores by averaging the last seven days of daily space occupancy, energy, and efficiency scores. The weekly space occupancy, energy, and efficiency scores may be stored in a Week Table and retained for a set period of time, such as 12 months.

Monthly Score Function

The Monthly Score Function may execute randomly once a month on a certain day between certain hours, such as between 12 AM and 1 AM on the first day of the month. On a monthly basis, the function may access the daily space occupancy, energy, and efficiency scores for the previous month from the Daily Table for each occupancy group and determine monthly space occupancy, energy, and efficiency scores by averaging the daily space occupancy, energy, and efficiency scores for the previous month. The monthly occupancy, energy, and efficiency scores may be stored in a Month Table and retained for a set period of time, such as 12 months.

In addition to collecting the relevant data and generating the various scores, the data manager 26 may also be configured to allow users to access the scores and display the scores in a convenient and effective manner from a variety of user devices 30. The data manager 26 may also allow users to identify, create, modify, name, and rename occupancy groups and spaces that represent one or more occupancy groups. While various software interfaces are available, web-based interfaces supported by the data manager 26 have proven to be both efficient and effective. As such, a user may log into the data manager 26 through a browser or other appropriate application running on the user device 30.

In one embodiment, the web-based interface provides a dashboard mode and an interactive mode. The dashboard mode is a simple webpage that is configured to provide a simple, yet effective scoring overview for one or more occupancy groups or spaces. The interactive mode allows a user to actively query for particular information and control the manner in which the information is provided. The interactive mode is particularly helpful for dynamically comparing scores for various spaces.

Figure 9:
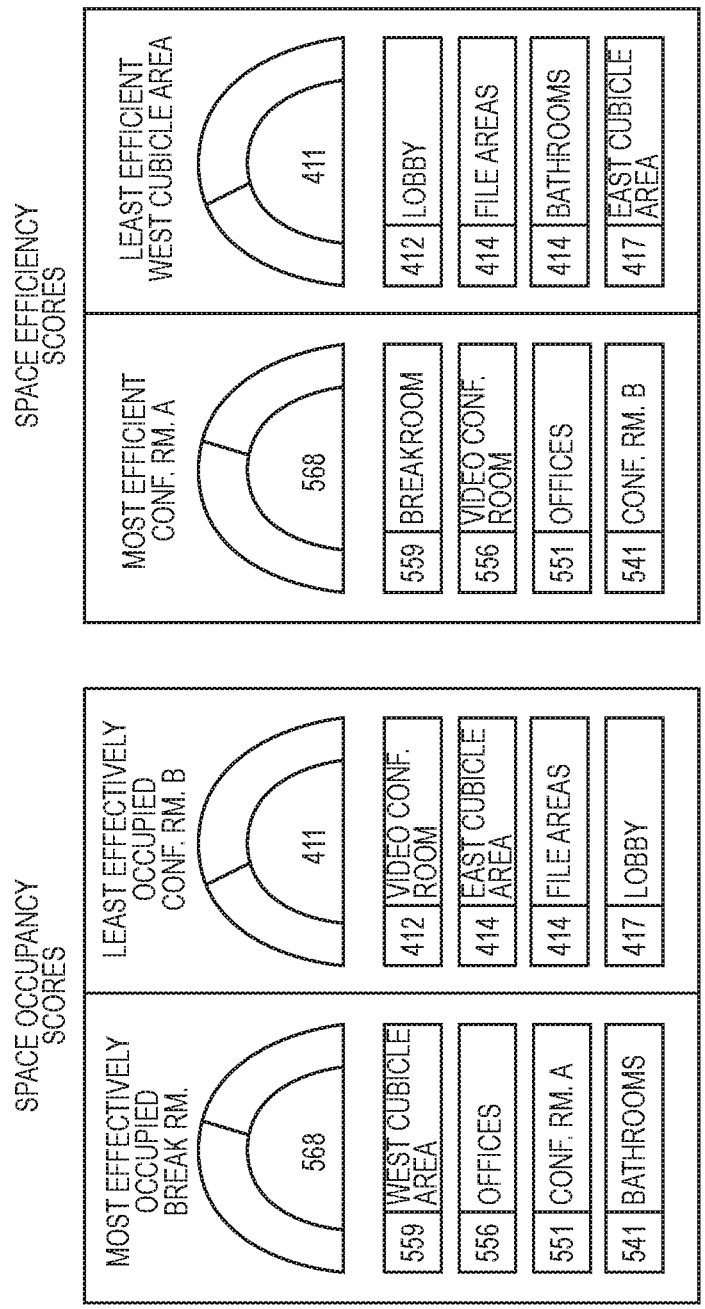
FIG. 9 illustrates an exemplary graphical user interface (GUI) for displaying space occupancy scores and space efficiency scores according to one embodiment of the present disclosure.

In dashboard mode, the data manager 26 may generate the scores and effect display of the scores in the manner illustrated in FIG. 9. In this example, the left side of the dashboard lists the five most effectively occupied and five least effectively occupied spaces based on space occupancy scores, and provides relative space occupancy scores for the listed spaces. The higher the score, the more effective the occupancy groups are configured with respect to actual occupancy conditions, and vice versa. The most effectively occupied and least effectively occupied spaces are highlighted at the top of the dashboard with a meter graphic, which is intended to indicate how the actual score stacks up with the maximum potential score.

The right side of the dashboard identifies the five most and least efficient spaces, based on space efficiency scores. The higher the score, the more efficient the space is with respect to overall lighting and the more effective the configuration of the occupancy groups is, and vice versa. While the dashboard is intended to provide a quick and effective snapshot of occupancy effectiveness and overall efficiency for the various spaces, the interactive mode supports a more in-depth view and analysis of the available data and scores, in particular.

Figure 10:
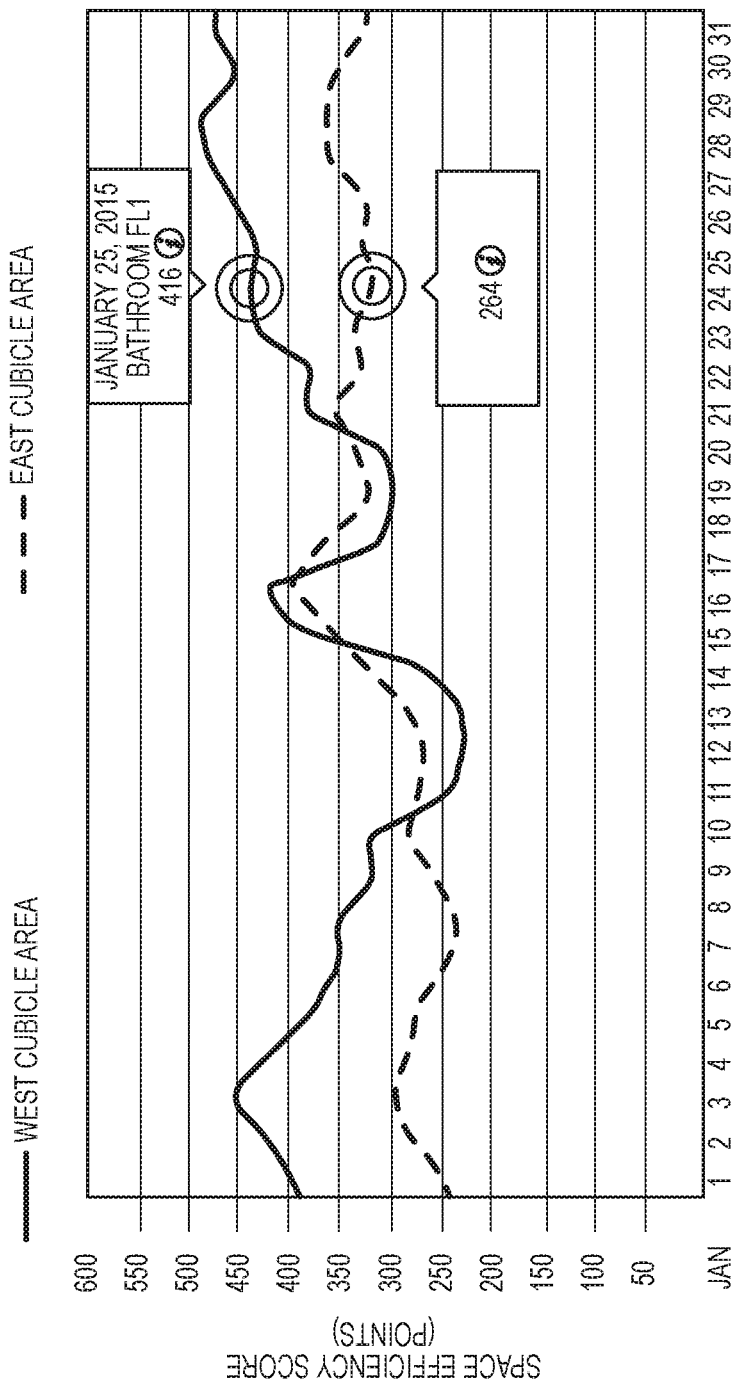
FIG. 10 illustrates an exemplary GUI for comparing space efficiency scores over a defined period of time according to one embodiment of the present disclosure.

In the interactive mode, a user may compare the different types of scores for the same or different spaces over any timeline, including in real-time. With reference to FIG. 10, the space efficiency scores for the West Cubicle Area and East Cubicle Area are compared throughout January. Notably, the space efficiency scores for the same space over different times may be compared. For example, the space efficiency scores and/or space occupancy scores for conference room A during January, 2015 and January, 2016 may be displayed and compared to see if efficiency or occupancy changed from one period to the next. Preferably, the user is able to drill down into the scores to have access to the individual scores from which the overall occupancy, energy, and efficiency scores are derived, as well as the data or configurations that are responsible for these individual scores.

Figure 11:
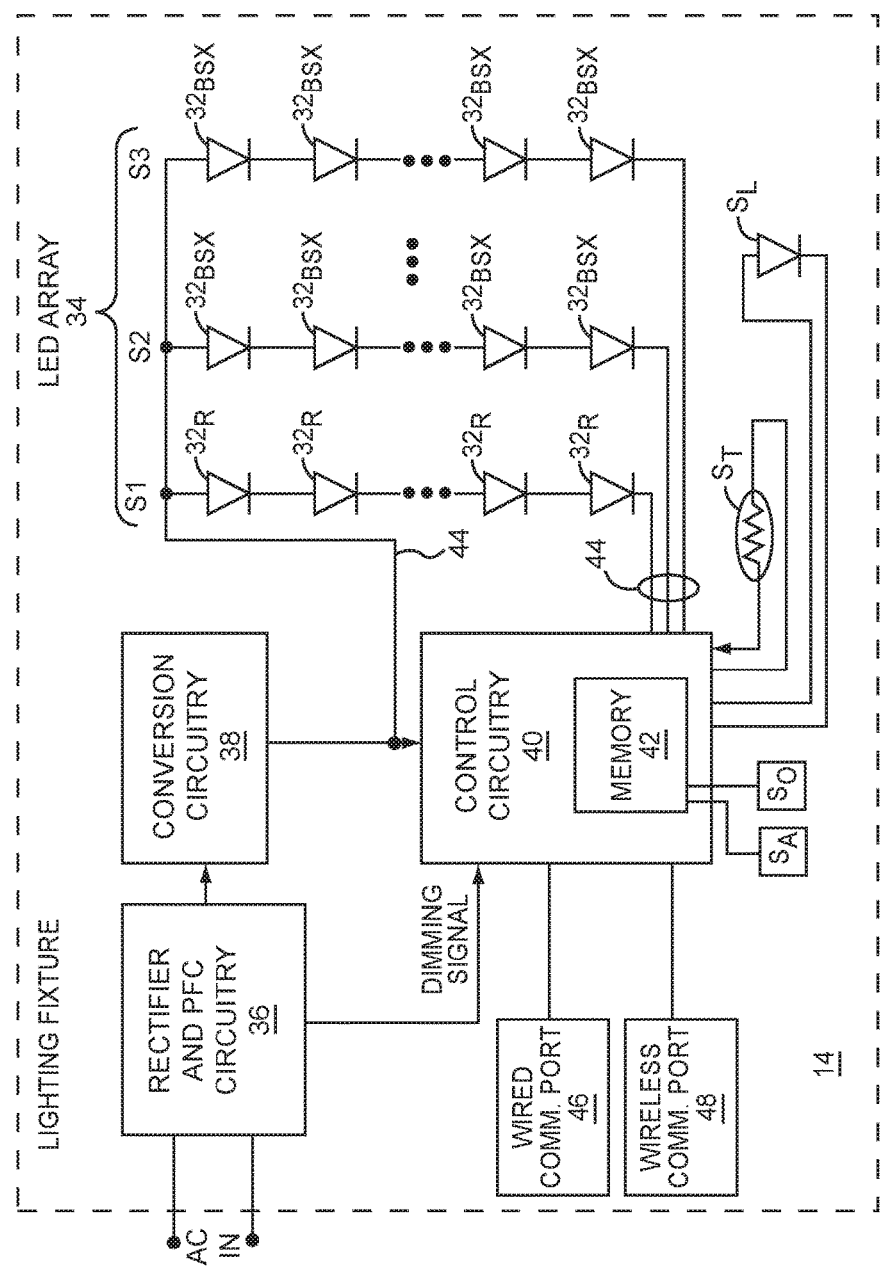
FIG. 11 is a block diagram of a lighting fixture according to a first embodiment of the present disclosure.

With reference to FIG. 11, a schematic of a typical lighting fixture 14 is illustrated. At the heart of the lighting fixture 14 are numerous LEDs 32, which form an LED array 34. The LEDs 32 may output light in the same or different colors, wherein the combined light output as white light at a desired correlated color temperature (CCT). For example, the LEDs 32 may be a mixture of red LEDs that emit reddish light ($32_R$) and either blue-shifted yellow (BSY) or blue-shifted green (BSG) that emit bluish yellow or bluish green light ($32_{BSX}$). When the light from the red LEDs and the BSY and/or BSG LEDs is combined, white light of the desired CCT is formed.

The LEDs 32 of the LED array 34 may be electrically divided into two or more strings of series-connected LEDs 32. As depicted, there are three LED strings S1, S2, and S3. Assume that the LEDs 32 of string S1 are red LEDs and that the LEDs 32 of strings S2 and S3 are BSY and/or BSG LEDs. The ratio of current provided through the red LEDs $32_R$ of the first LED string S1 relative to the currents provided through the BSY or BSG LEDs $32_{BSX}$ of the second and third LED strings S2 and S3 may be adjusted to effectively control the relative intensities of the reddish light emitted from the red LEDs $32_R$ and the combined yellowish or greenish light emitted from the various BSY or BSG LEDs $32_{BSX}$. As such, the intensity and the color point of the yellowish or greenish light from BSY or BSG LEDs $32_{BSX}$ can be set relative to the intensity of the reddish light emitted from the red LEDs $32_R$. The resultant yellowish or greenish light mixes with the reddish light to generate white light that has a desired color temperature.

Notably, the number of LED strings Sx may vary from one to many, and different combinations of LED colors may be used in the different strings. Each LED string Sx may have LEDs 32 of the same color, variations of the same color, or substantially different colors, such as red, green, and blue. In one embodiment, a single LED string may be used, wherein the LEDs in the string are all substantially identical in color, vary in substantially the same color, or include different colors. In another embodiment, three LED strings Sx with red, green, and blue LEDs may be used, wherein each LED string Sx is dedicated to a single color. In yet another embodiment, at least two LED strings Sx may be used, wherein different colored BSY LEDs are used in one of the LED strings Sx and red LEDs are used in the other of the LED strings Sx.

The lighting fixture 14 generally includes rectifier and power factor correction (PFC) circuitry 36, conversion circuitry 38, and control circuitry 40. The rectifier and PFC circuitry 36 is adapted to receive an AC power signal (AC IN), rectify the AC power signal, and correct the power factor of the AC power signal. The resultant signal is provided to the conversion circuitry 38, which converts the rectified AC power signal to a DC power signal. The DC power signal may be boosted or bucked to one or more desired DC voltages by DC-DC converter circuitry, which is provided by the conversion circuitry 38. Internally, the DC power signal may be used to power control circuitry 40 and any other circuitry provided in the lighting fixture 14.

As illustrated, the DC power signal may be provided to another port, which will be connected by cabling 44 to the LED array 34. In this embodiment, the supply line of the DC power signal is ultimately coupled to the first end of each of the LED strings S1, S2, and S3 in the LED array 34. The control circuitry 40 is coupled to the second end of each of the LED strings 51, S2, and S3 by the cabling 44. Based on any number of fixed or dynamic parameters, the control circuitry 40 may individually control the pulse width modulated current that flows through the respective LED strings S1, S2, and S3 such that the resultant white light emitted from the LED strings S1, S2, and S3 has a desired color temperature. In certain instances, a dimming device controls the AC power signal. The rectifier and PFC circuitry 36 may be configured to detect the relative amount of dimming associated with the AC power signal and provide a corresponding dimming signal to the control circuitry 40. Based on the dimming signal, the control circuitry 40 will adjust the current provided to each of the LED strings S1, S2, and S3 to effectively reduce the intensity of the resultant white light emitted from the LED strings S1, S2, and S3 while maintaining the desired color temperature.

The intensity or color of the light emitted from the LEDs 32 may be affected by ambient temperature. If associated with a thermistor $S_T$ or other temperature-sensing device, the control circuitry 40 can control the current provided to each of the LED strings S1, S2, and S3 based on ambient temperature in an effort to compensate for adverse temperature effects. The intensity or color of the light emitted from the LEDs 32 may also change over time. If associated with an LED light sensor $S_L$, the control circuitry 40 can measure the color of the resultant white light being generated by the LED strings S1, S2, and S3 and adjust the current provided to each of the LED strings S1, S2, and S3 to ensure that the resultant white light maintains a desired color temperature or other desired metric. The control circuitry 40 may also monitor the output of the occupancy and ambient light sensors $S_O$ and $S_A$ for activity and ambient light information, as described above. The occupancy and ambient light sensors sensors $S_O$ and $S_A$ may be separate sensors or may be integrated into a single sensor, such as an image sensor, the output of which can be used to detect activity for occupancy detection as well as ambient light levels.

The control circuitry 40 may include a central processing unit (CPU), sufficient memory 42, and the requisite software to enable the lighting fixture 14 to operate as described herein. The control circuitry 40 may be associated with various wired or wireless communication ports 46 and 48 to facilitate communications with the other lighting fixtures 14 and remote devices, as described above.

Figure 12:
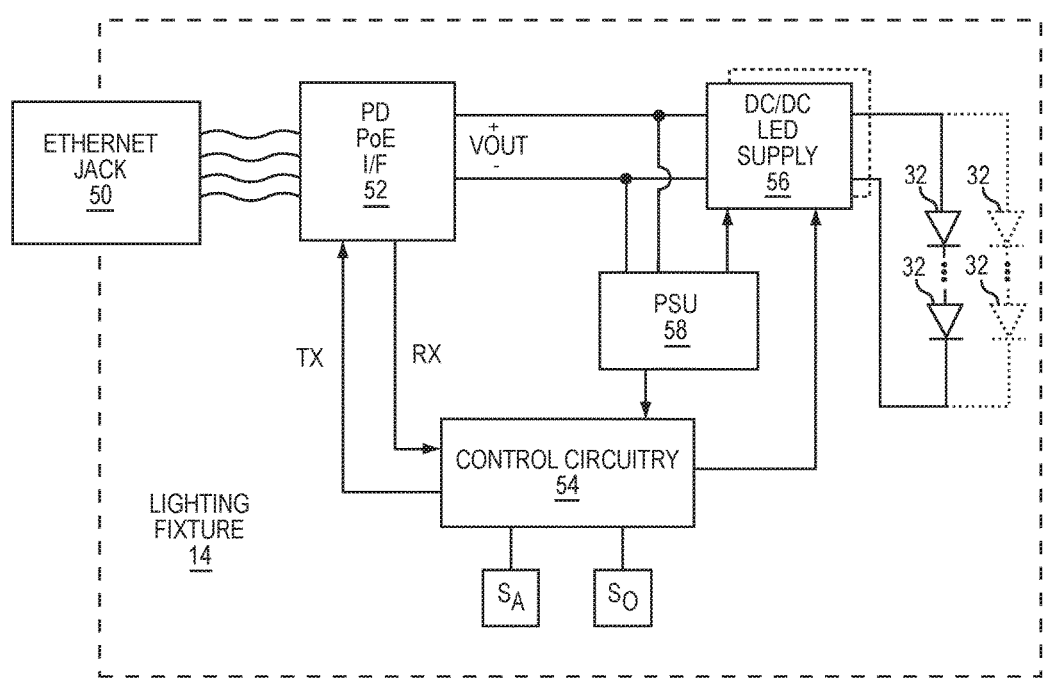
FIG. 12 is a block diagram of a lighting fixture according to a second embodiment of the present disclosure.

FIG. 12 illustrates an exemplary lighting fixture 14, which is configured as a PoE device, which receives power and facilitates communications over an Ethernet cable plugged into an Ethernet jack 50. The Ethernet jack 50 is coupled to a PoE interface 52, which provides data received at the Ethernet jack from a remote device to control circuitry 54. The PoE interface 52 passes data to be transmitted from the control circuitry 54 to the Ethernet jack 50 for delivery to the remote device.

The PoE interface 52 also provides an output voltage VOUT to one or more DC/DC LED supplies 56 as well as a power supply unit (PSU) 58. Each DC/DC LED supply 56 may be configured to drive one or more strings of LEDs 32, wherein each string may have LEDs of the same or different color, as previously described. The DC/DC LED supply at 56 may receive a control signal from the control circuitry 54. The control signal may be analog or digital and is used to set the drive voltage placed across each string of LEDs 32 by the DC/DC LED supply 56. Controlling the current through each string of LEDs 32 will effectively set the brightness level for each of the respective LEDs 32.

The PSU 58 acts as a low voltage power supply, voltage reference, or the like for various components of the lighting fixture 14. In this example, the PSU 58 provides a supply voltage for the control circuitry 54 and a voltage reference or bias voltage for the DC/DC LED supply 56.

Figure 13:
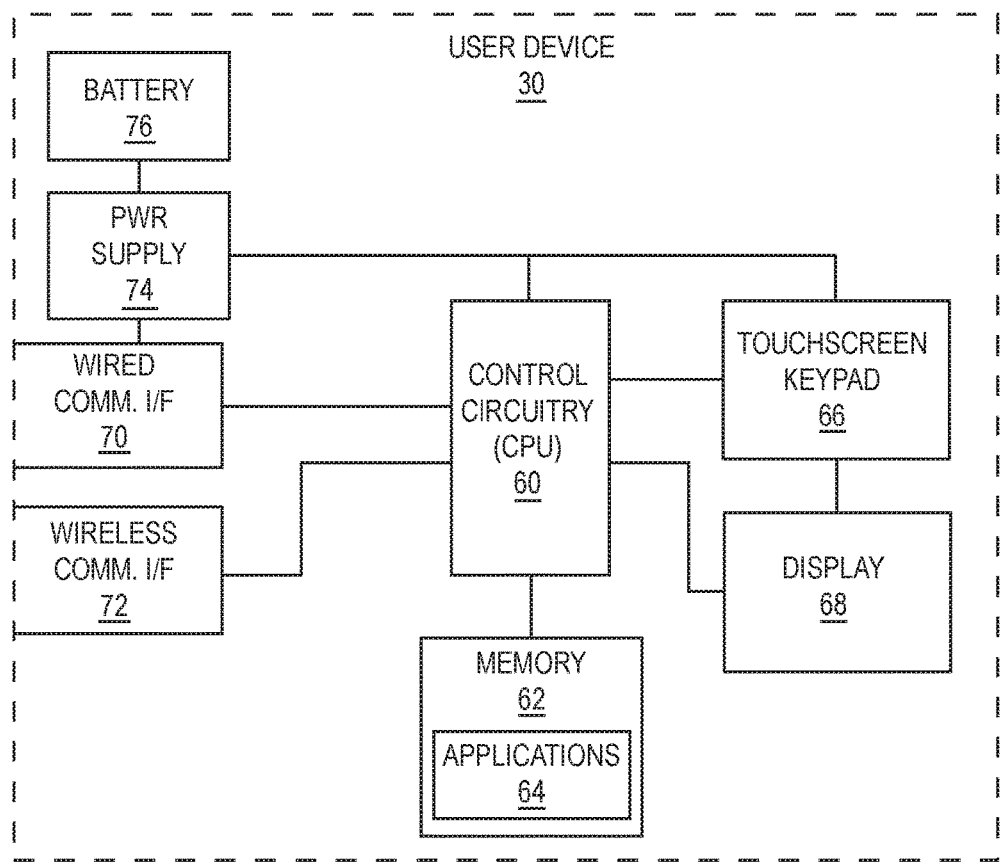
FIG. 13 is a block diagram of a user device 30 according to one embodiment of the present disclosure.

With reference to FIG. 13, an exemplary user device 30 is illustrated. The user device 30 may include control circuitry 60, such as a central processing unit (CPU), and sufficient memory 62 with the requisite software applications 64 to facilitate the functionality described above. The control circuitry 60 may be associated with a keypad 66 and display 68, which act in combination to provide a user interface. The keypad 66 may be a traditional alpha-numeric keypad and/or a series of buttons that have specifically assigned functions. The display 68 may be a touchscreen display, wherein a separate hardware-based keypad 66 is not needed. The control circuitry 60 is associated with one or more communication interfaces, such as a wired communication interface 70 and a wireless communication interface 72, which facilitate wired or wireless communications with any of the lighting fixtures 14 and remote devices. All of the electronics in the user device 30 may be powered from an appropriate power supply 74, which is coupled to the wired communication interface 70 and battery 76.

Figure 14:
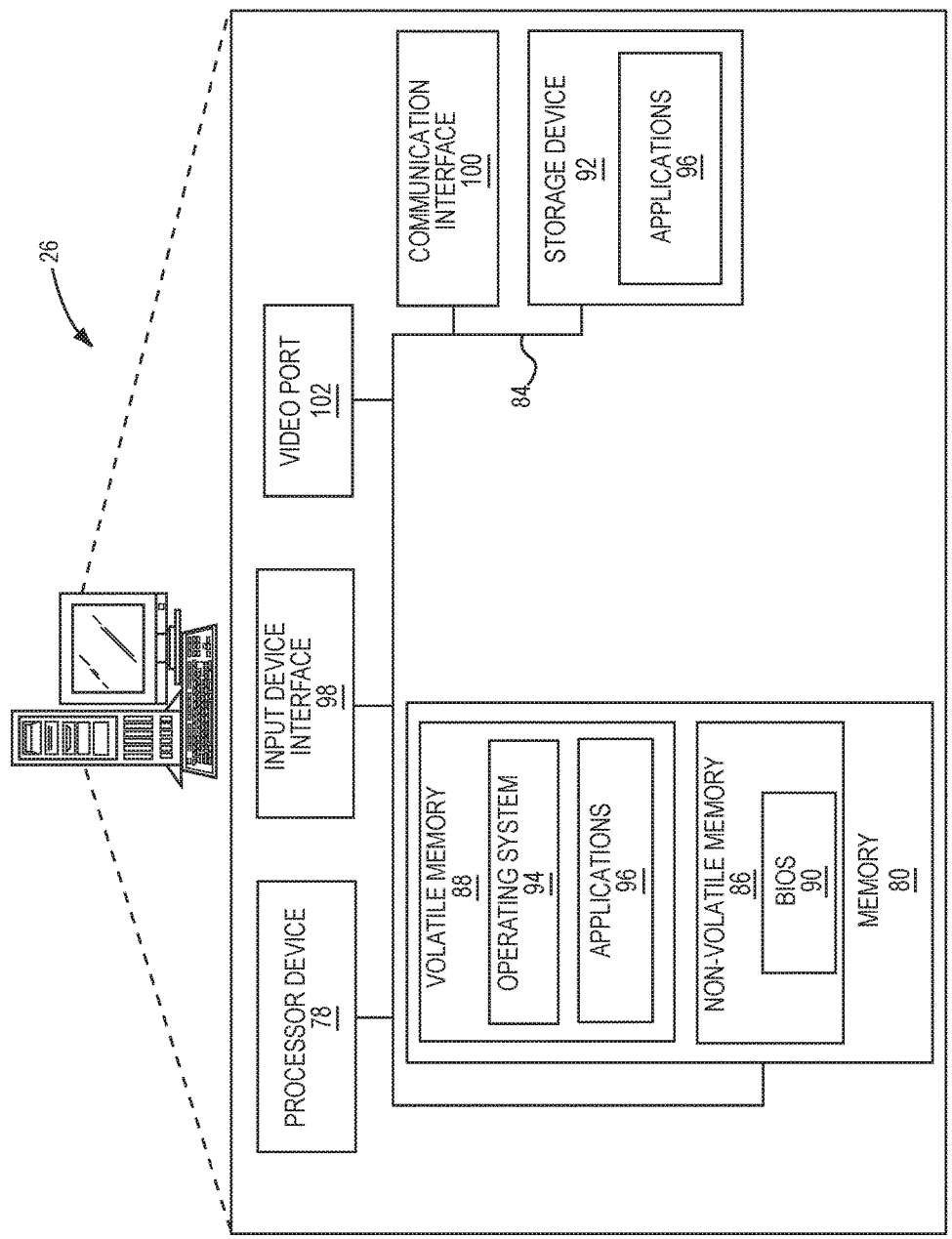
FIG. 14 is a schematic of a data manager according to one embodiment of the present disclosure

FIG. 14 is a block diagram of the data manager 26 suitable for implementing the concepts of the present disclosure according to one example. The data manager 26 may comprise any computing or electronic device capable of including firmware, hardware, and/or executing software instructions to implement the functionality described herein, such as a computer server, a desktop computing device, a laptop computing device, a smartphone, a computing tablet, or the like. The data manager 26 includes a processor device 78, system memory 80, and a system bus 84. The system memory 80 may include non-volatile memory 86 and volatile memory 88. The non-volatile memory 86 may include read-only memory (ROM), erasable programmable read-only memory (EPROM), electrically erasable programmable read-only memory (EEPROM), and the like. The volatile memory 88 generally includes random-access memory (RAM)). A basic input/output system (BIOS) 90 may be stored in the non-volatile memory 86 and can include the basic routines that help to transfer information between elements within the data manager 26.

The system bus 84 provides an interface for system components including, but not limited to, the system memory 80 and the processor device 78. The system bus 84 may be any of several types of bus structures that may further interconnect to a memory bus (with or without a memory controller), a peripheral bus, and/or a local bus using any of a variety of commercially available bus architectures. The processor device 78 can be any commercially available or proprietary processor, central processing unit (CPU), microcontroller, or the like.

The data manager 26 may further include or be coupled to a non-transitory computer-readable storage medium, such as a storage device 92, which may represent an internal or external hard disk drive (HDD), flash memory, or the like. The storage device 92 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 94 and any number of applications 96 can be stored in the volatile memory 88, wherein the applications 96 represent a wide array of computer-executable instructions corresponding to programs, applications, functions, and the like that may implement the functionality described herein in whole or in part. The applications 96 may also reside on the storage mechanism provided by the storage device 92. As such, all or a portion of the functionality described herein may be implemented as a computer program product stored on a transitory or non-transitory computer-usable or computer-readable storage medium, such as the storage device 92, volatile memory 88, non-volatile memory 86, and the like. The computer program product includes complex programming instructions, such as complex computer-readable program code, to cause the processor device 78 to carry out the steps necessary to implement the functions described herein. The processor device 78 may serve as a controller or control system for the data manager 26 to implement the functionality described herein based on the computer program product.

An operator, such as the user, may also be able to enter one or more configuration commands through a keyboard, a pointing device such as a mouse, or a touch-sensitive surface, such as the display device, via an input device interface 98 or remotely through a web interface, terminal program, or the like via a communication interface 100. The display device (not shown), which is coupled to the system bus 84, may be driven via a video port 102. The communication interface 100 may be wired or wireless and facilitate communications with any number of devices via the communication network 22, border router 20, lighting fixtures 14, wall controller 12, and user devices 30, in a direct or indirect fashion.

Those skilled in the art will recognize improvements and modifications to the preferred embodiments of the present disclosure. All such improvements and modifications are considered within the scope of the concepts disclosed herein and the claims that follow.

What is claimed is:

1. A computing device to associate with a lighting network having a plurality of lighting fixtures grouped into a plurality of occupancy groups, the computing device comprising:
    a communication interface;
    a memory; and
    a processor device coupled to the memory and the communication interface to:
        for each occupancy group of the plurality of occupancy groups:
            receive at least one occupancy parameter for an occupancy group;
            receive at least one energy consumption parameter for the occupancy group; and
            generate a space efficiency score based on both the at least one occupancy parameter and the at least one energy consumption parameter; and
        provide for presentation to a user the space efficiency score for at least one of the plurality of occupancy groups.

2. The computing device of claim 1 wherein, for each occupancy group, the at least one occupancy parameter allows the processor device to determine a number of the plurality of lighting fixtures in the occupancy group, such that the space efficiency score is a function of the number of the plurality of lighting fixtures in the occupancy group.

3. The computing device of claim 1 wherein the at least one occupancy parameter allows the processor device to determine a number of the plurality of lighting fixtures that detect activity when any of the plurality of lighting fixtures in the occupancy group detect the activity, such that the space efficiency score is a function of the number of the plurality of lighting fixtures that detect the activity when any of the plurality of lighting fixtures in the occupancy group detect the activity.

4. The computing device of claim 3 wherein, for each occupancy group, the at least one occupancy parameter allows the processor device to determine a number of the plurality of lighting fixtures in the occupancy group, such that the space efficiency score is a function of the number of the plurality of lighting fixtures in the occupancy group and the number of the plurality of lighting fixtures that detect the activity when any of the plurality of lighting fixtures in the occupancy group detect the activity.

5. The computing device of claim 4 wherein the space efficiency score is a function of:
    a ratio of a number of the plurality of lighting fixtures in the occupancy group that detect the activity to the number of lighting fixtures in the occupancy group; and
    the number of the plurality of lighting fixtures in the occupancy group.

6. The computing device of claim 4 wherein:
    the at least one energy consumption parameter includes a static setting of one or more lighting fixtures in the occupancy group, and the static setting is at least one of a task tuning level and an auto-off level of the one or more lighting fixtures in the occupancy group; and
    the at least one energy consumption parameter is indicative of an actual light output level of the one or more lighting fixtures in the occupancy group based on at least one of user input via a wall controller and daylight harvesting data provided by the one or more lighting fixtures in the occupancy group.

7. The computing device of claim 4 wherein:
    the at least one energy consumption parameter includes static settings of one or more lighting fixtures in the occupancy group, and the static settings include a task tuning level and an auto-off level of the one or more lighting fixtures in the occupancy group; and
    the at least one energy consumption parameter is indicative of an actual light output level of the one or more lighting fixtures in the occupancy group based on user input via a wall controller and daylight harvesting data provided by the one or more lighting fixtures in the occupancy group.

8. The computing device of claim 3 wherein:
    the at least one energy consumption parameter includes a static setting of one or more lighting fixtures in the occupancy group, and the static setting is at least one of a task tuning level and an auto-off level of the one or more lighting fixtures in the occupancy group;
    the at least one energy consumption parameter includes a dynamic setting indicative of an actual light output level of the one or more lighting fixtures in the occupancy group based on at least one of user input via a wall controller and daylight harvesting data provided by the one or more lighting fixtures in the occupancy group.

9. The computing device of claim 1 wherein the at least one energy consumption parameter includes a static setting of one or more lighting fixtures in the occupancy group, and the static setting is at least one of a task tuning level and an auto-off level of the one or more lighting fixtures in the occupancy group.

10. The computing device of claim 1 wherein the at least one energy consumption parameter is indicative of an actual light output level of one or more lighting fixtures in the occupancy group.

11. The computing device of claim 10 wherein the actual light output level is controlled by user input via a wall controller.

12. The computing device of claim 10 wherein the actual light output level is controlled in response to daylight harvesting data provided by the one or more lighting fixtures in the occupancy group.

13. The computing device of claim 1 wherein the processor device is further configured to determine a modification to make to the at least one of the plurality of occupancy groups based on the space efficiency score, and present the modification to the user, wherein the modification either adds or removes a lighting fixture from the at least one of the plurality of occupancy groups.

14. The computing device of claim 1 wherein the processor device is further configured to determine a modification to make to the at least one of the plurality of occupancy groups based on the space efficiency score, and present the modification to the user, wherein the modification changes a setting for a lighting fixture in the at least one of the plurality of occupancy groups.

15. The computing device of claim 1 wherein the processor device is further configured to determine a modification to make to the at least one of the plurality of occupancy groups based on the space efficiency score, and communicate with at least one lighting fixture in the at least one of the plurality of occupancy groups to effect the modification, wherein the modification either adds or removes a lighting fixture from the at least one of the plurality of occupancy groups.

16. The computing device of claim 1 wherein the processor device is further configured to determine a modification to make to the at least one of the plurality of occupancy groups based on the space efficiency score, and communicate with at least one lighting fixture in the at least one of the plurality of occupancy groups to effect the modification, wherein the modification changes a setting for a lighting fixture in the at least one of the plurality of occupancy groups.

17. The computing device of claim 1 wherein a first space is associated with at least two of the plurality of occupancy groups and the processor device is further configured to:
generate an aggregated space efficiency score based on the space efficiency score for the at least two of the plurality of occupancy groups; and
present the aggregated space efficiency score for display to the user.

18. The computing device of claim 1 wherein the processor device is configured to present the space efficiency score for each of the plurality of occupancy groups for display to the user, such that each space efficiency score is associated with a unique identifier, which identifies a unique space associated with the at least one of the plurality of occupancy groups.

19. A computing device to associate with a lighting network having a plurality of lighting fixtures grouped into a plurality of occupancy groups, the computing device comprising:
a communication interface;
a memory; and
a processor device coupled to the memory and the communication interface to:
for each occupancy group of the plurality of occupancy groups:
receive at least one occupancy parameter for the occupancy group; and
generate a space occupancy score based on the at least one occupancy parameter; and
provide for presentation to a user the space occupancy score for at least one of the plurality of occupancy groups, wherein the at least one occupancy parameter allows the processor device to determine a number of the plurality of lighting fixtures that detect activity when any of the plurality of lighting fixtures in an occupancy group detect the activity, such that the space occupancy score is a function of the number of the plurality of lighting fixtures that detect the activity when any of the plurality of lighting fixtures in the occupancy group detect the activity.

20. The computing device of claim 19 wherein, for each occupancy group, the at least one occupancy parameter allows the processor device to determine a number of the plurality of lighting fixtures in the occupancy group, such that the space occupancy score is a function of the number of the plurality of lighting fixtures in the occupancy group and the number of the plurality of lighting fixtures that detect the activity when any of the plurality of lighting fixtures in the occupancy group detect the activity.

21. The computing device of claim 20 wherein the space occupancy score is a function of:
a ratio of a number of the plurality of lighting fixtures in the occupancy group that detect the activity to a number of lighting fixtures in the occupancy group; and
the number of the plurality of lighting fixtures in the occupancy group.

22. A computing device to associate with a lighting network having a plurality of lighting fixtures grouped into a plurality of occupancy groups, the computing device comprising:
a communication interface;
a memory; and
a processor device coupled to the memory and the communication interface to:
for each occupancy group of the plurality of occupancy groups:
receive at least one energy consumption parameter for an occupancy group; and
generate a space energy score based on the at least one energy consumption parameter; and
provide for presentation to a user the space energy score for at least one of the plurality of occupancy groups, wherein:
the at least one energy consumption parameter includes a static setting of one or more lighting fixtures in the occupancy group, and the static setting is at least one of a task tuning level and an auto-off level of the one or more lighting fixtures in the occupancy group;
the at least one energy consumption parameter includes a dynamic setting indicative of an actual light output level of the one or more lighting fixtures in the occupancy group based on at least one of user input via a wall controller and daylight harvesting data provided by the one or more lighting fixtures in the occupancy group.

23. The computing device of claim 22 wherein the actual light output level is controlled by the user input via the wall controller.

24. The computing device of claim 22 wherein the actual light output level is controlled in response to the daylight harvesting data provided by the one or more lighting fixtures in the occupancy group.

25. A computer program product stored on a non-transitory computer-readable storage medium and including instructions that cause a processor device, which is associated with a lighting network having a plurality of lighting fixtures grouped into a plurality of occupancy groups, to:
for each occupancy group of the plurality of occupancy groups:
receive at least one occupancy parameter for an occupancy group;

receive at least one energy consumption parameter for the occupancy group; and generate a space efficiency score based on both the at least one occupancy parameter and the at least one energy consumption parameter; and present the space efficiency score for at least one of the plurality of occupancy groups for display to a user.

* * * * *